UNITED STATES PATENT OFFICE.

GEORGE LITTLE, OF RUTHERFORD PARK, NEW JERSEY.

IMPROVEMENT IN COMPOSITIONS FOR CHEMICAL TELEGRAPH-PAPER.

Specification forming part of Letters Patent No. 130,810, dated August 27, 1872.

*To all whom it may concern:*

Be it known that I, GEORGE LITTLE, of Rutherford Park, in the county of Bergen and State of New Jersey, have invented an Improvement in Chemical Telegraph-Paper; and the following is a correct description thereof:

This paper is prepared with a solution, hereafter described, and is adapted to making a blue-black mark by an iron stylus at the time the electric current passes through the same; but it may be used with a platinum or gold stylus, the mark, however, not being as heavy.

I make use of twelve parts, by weight, of pure water; four parts of a saturated solution of chloride of calcium, (from the crystallized deliquescent salt;) two parts of a saturated solution of ferrocyanide of potassium. To a mixture of the above I add sufficient chromic acid to produce a dark sherry-color, and about one-fiftieth of one part of chloride of sodium.

After this solution is mixed and allowed to remain it will become clear, and is adapted to use in moistening paper for chemical telegraphs; it is very sensitive under the electric current from an iron stylus; and the mark is permanent.

The proportions might be slightly varied, and I find that the ingredients employed cause the paper to retain moisture for a greater length of time than the ingredients heretofore introduced in chemical paper.

This chemical paper may be used in any receiving-telegraph instrument wherever available, either for land lines or for cables.

I claim as my invention—

The composition, herein specified, for preparing chemical paper for telegraphic purposes.

Signed by me this 24th day of May, A. D. 1872.

GEORGE LITTLE.

Witnesses:
GEO. T. PINCKNEY,
CHAS. H. SMITH.